United States Patent
Isogai et al.

(10) Patent No.: US 12,134,703 B2
(45) Date of Patent: Nov. 5, 2024

(54) WATER-BASED INK, PRINTED RECORDING MEDIUM, INKJET RECORDING METHOD, INKJET RECORDING DEVICE, AND INK STORAGE CONTAINER

(71) Applicant: BROTHER KOGYO KABUSHIKI KAISHA, Nagoya (JP)

(72) Inventors: Masato Isogai, Obu (JP); Makito Iguchi, Nagoya (JP); Nao Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 114 days.

(21) Appl. No.: 18/059,461

(22) Filed: Nov. 29, 2022

(65) Prior Publication Data

US 2023/0167318 A1 Jun. 1, 2023

(30) Foreign Application Priority Data

Dec. 1, 2021 (JP) .................................. 2021-195236

(51) Int. Cl.
*C09D 11/32* (2014.01)
*C09D 11/38* (2014.01)

(52) U.S. Cl.
CPC .............. *C09D 11/32* (2013.01); *C09D 11/38* (2013.01)

(58) Field of Classification Search
CPC .................................. C09D 11/32; C09D 11/38
See application file for complete search history.

(56) References Cited

U.S. PATENT DOCUMENTS

| 5,609,671 A | 3/1997 | Nagasawa |
| 2005/0014864 A1 | 1/2005 | Akers, Jr. et al. |
| 2006/0176349 A1 | 8/2006 | Nagai et al. |
| 2008/0241398 A1 | 10/2008 | Kato et al. |
| 2018/0265721 A1 | 9/2018 | Nakano et al. |
| 2020/0086639 A1 | 3/2020 | Morikawa et al. |
| 2020/0262213 A1 | 8/2020 | Kuno et al. |
| 2020/0376854 A1 | 12/2020 | Morita et al. |

FOREIGN PATENT DOCUMENTS

| JP | H08-3498 A | 1/1996 |
| JP | 2000513396 A | 10/2000 |
| JP | 2002036599 A | 2/2002 |

(Continued)

OTHER PUBLICATIONS

Yoda, Atsushi et al., (WO 2021/176792 A1) Water-Based Ink-Jet Ink and Printed Matter, Sep. 10, 2021, [Abstract] (Year: 2021).*

(Continued)

*Primary Examiner* — Lisa Solomon
(74) *Attorney, Agent, or Firm* — Element IP, PLC

(57) ABSTRACT

A water-based ink includes a colorant, water, a penetrating agent, and a wetting agent. The penetrating agent includes diethylene glycol monohexyl ether (DEHE). The wetting agent includes a compound having an SP value of 12 to 14. A ratio (A/B) of an amount (A) of the compound having an SP value of 12 to 14 to the amount (B) of DEHE is 2.5 or more. The wetting agent preferably includes at least one of triethylene glycol and tripropylene glycol. The ratio (A/B) of the amount (A) of the compound having an SP value of 12 to 14 to the amount (B) of DEHE is preferably 2.5 or more and less than 10.

17 Claims, 1 Drawing Sheet

(56) References Cited

FOREIGN PATENT DOCUMENTS

| | | | |
|---|---|---|---|
| JP | 2005089713 A | 4/2005 | |
| JP | 2008524400 A | 7/2008 | |
| JP | 2008246821 A | 10/2008 | |
| JP | 2009515007 A | 4/2009 | |
| JP | 2011515535 A | 5/2011 | |
| JP | 2015199790 A | 11/2015 | |
| JP | 2018154736 A | 10/2018 | |
| JP | 2020044679 A | 3/2020 | |
| JP | 2020131576 A | 8/2020 | |
| WO | WO-9748769 A1 | 12/1997 | |
| WO | WO-2006066132 A2 | 6/2006 | |
| WO | WO-2006066132 A3 | 6/2006 | |
| WO | WO-2007053564 A2 | 5/2007 | |
| WO | WO-2007053564 A3 | 5/2007 | |
| WO | WO-2009117071 A1 | 9/2009 | |

OTHER PUBLICATIONS

Extended European Search Report issued Apr. 28, 2023 in Patent Application No. 22208485.7, 7 pages.

* cited by examiner

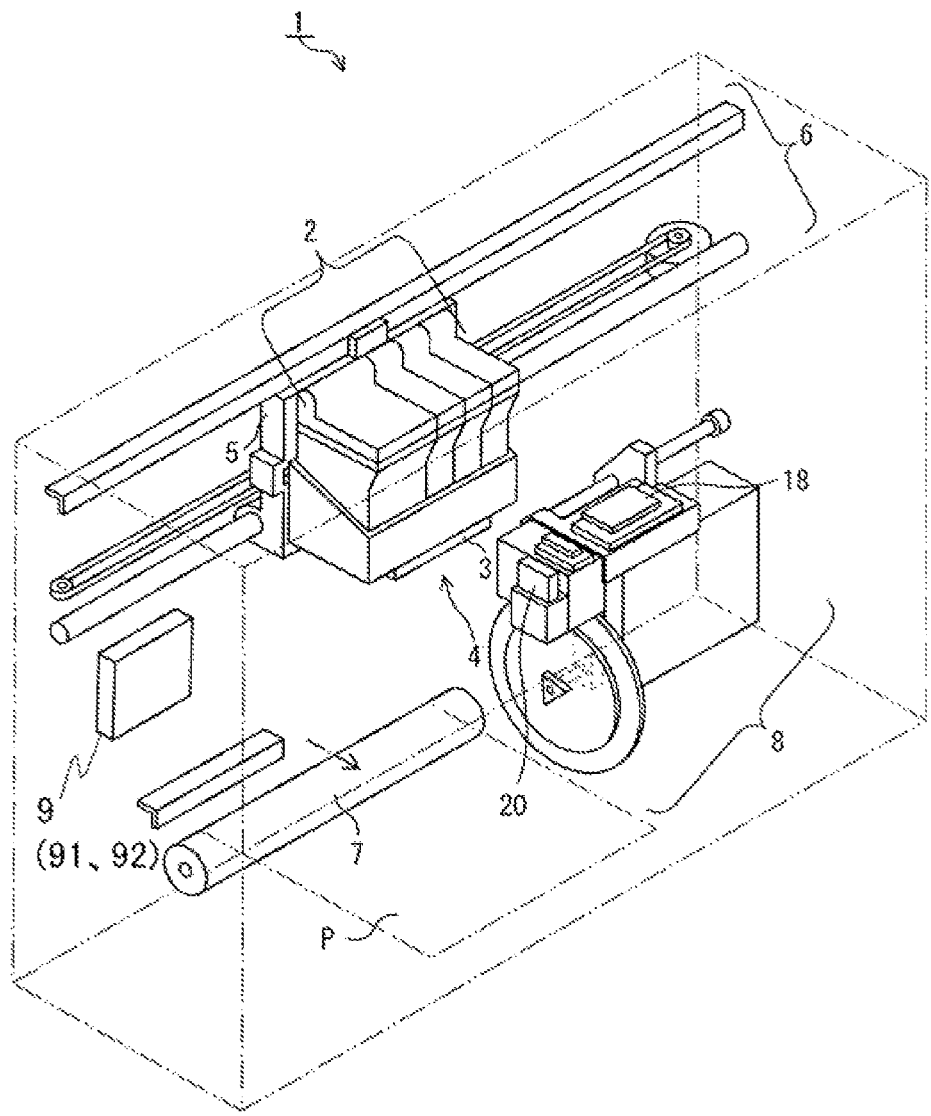

und lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

WATER-BASED INK, PRINTED RECORDING MEDIUM, INKJET RECORDING METHOD, INKJET RECORDING DEVICE, AND INK STORAGE CONTAINER

CROSS-REFERENCE TO RELATED APPLICATIONS

The present claims priority to Japanese Patent Application No. 2021-195236, filed Dec. 1, 2021, the entire disclosure of which is incorporated herein by reference.

BACKGROUND OF THE DISCLOSURE

Technical Field

The present disclosure relates to a water-based ink, a printed recording medium, an inkjet recording method, an inkjet recording device, and an ink storage container.

Background Art

In order to achieve both discharge stability and image quality, a water-based ink for inkjet recording containing 1,2-hexanediol as a penetrating agent is known.

SUMMARY OF THE DISCLOSURE

According to an aspect of the present disclosure, a water-based ink includes a colorant, water, a penetrating agent, and a wetting agent. The penetrating agent includes diethylene glycol monohexyl ether (DEHE). The wetting agent includes a compound having an SP value of 12 to 14. A ratio (AB) of an amount (A) of the compound having an SP value of 12 to 14 to the amount (B) of DEHE is 2.5 or more.

According to another aspect of the present disclosure, a printed recording medium includes a substrate, and the above-described water-based ink, printed on the substrate.

According to a further aspect of the present disclosure, an inkjet recording method includes ejecting the above-described water-based ink onto a recording medium to record an image on the recording medium.

According to a further aspect of the present disclosure, an inkjet recording device includes the above-described water-based ink, an ink storing unit storing the water-based ink, and an ink ejecting unit capable of ejecting the water-based ink to a recording medium.

According to a further aspect of the present disclosure, an ink storage container includes the above-described water-based ink stored therein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein the FIGURE is a perspective view of an exemplary inkjet recording device according to the present disclosure.

DESCRIPTION OF THE EMBODIMENTS

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

From the viewpoint of global environmental protection, reducing the generation of VOCs (volatile organic compounds) is a requirement. However, 1,2-hexanediol has a standard boiling point of 223 to 224° C., and is prone to VOC generation.

When a penetrating agent with a high standard boiling point is used in place of 1,2-hexanediol for the purpose of reducing VOC generation, the image quality of materials recorded using a water-based dye ink for inkjet recording may deteriorate, the stability of continuous ejection from the nozzle of the inkjet head (ejection stability) may decrease, and storage stability may also decrease.

According to one embodiment of the present disclosure, the water-based ink for inkjet recording contains a colorant, water, a penetrating agent, and a wetting agent, where the penetrating agent contains diethylene glycol monohexyl ether (DEHE), the wetting agent contains a wetting agent with an SP value of 12 to 14, and the ratio (AB) of the wetting agent with an SP value of 12 to 14 (A) to the amount of DEHE (B) is 2.5 or higher.

By including a colorant, water, a specific penetrating agent, and a specific wetting agent, which enables a reduction of VOC generation, the water-based ink for inkjet recording of the present disclosure provides excellent image quality, ejection stability (redispersibility), and storage stability.

In the present disclosure, "redispersibility" of water-based ink refers to the solubility or dispersibility of solids when the water-based ink comes into contact with a new water-based ink after the ink has first dried and formed a solid, for example. If redispersibility is inferior, for example, after the water-based ink is heated in the inkjet head and solids are generated by evaporation and drying, the solids will not dissolve or disperse when brought into contact with a new water-based ink, resulting in ejection defects.

In the present disclosure, the term "mass" may be read as "weight" unless otherwise specified. For example, "mass ratio" may be read as "weight ratio" unless otherwise specified, and "mass %" may be read as "weight %" unless otherwise specified.

In the present disclosure, saturation (C*) is calculated, for example, from a* and b* based on the L*a*b* color system (CIE 1976 (L*a*b*) color system) standardized by the International Commission on Illumination (CIE) in 1976, using the following formula (see JISZ8729). $C^* = \{(a^*2) + (b^*2)\}1/2$ Exemplary embodiments of water-based ink for inkjet recording of the present disclosure (hereinafter referred to as "water-based ink" or "ink") are described below. The water-based ink of the present disclosure contains a colorant, water, a penetrating agent, and a wetting agent.

The colorant may be either a pigment or a dye. In addition, a mixture of pigments and dyes may be used as the colorant.

The pigment is not particularly limited, and includes, for example, carbon black, inorganic pigments, organic pigments, and the like. Examples of the carbon black include furnace black, lamp black, acetylene black, channel black, and the like. Examples of inorganic pigments include titanium dioxide, iron oxide inorganic pigments, carbon black inorganic pigments, and the like. Examples of the organic pigments include azo pigments such as azo lakes, insoluble azo pigments, condensed azo pigments, chelated azo pigments; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye-type lake pigments and acid dye-type lake pigments; nitro pigments such as nitroso pigments; aniline black daylight fluorescent pigments; and the like. Other pigments can also be used if they can be dispersed in a water-based phase. Specific examples of these pigments include C.I. Pigment Black 1, 6 and 7; C.I. Pigment Yellow 1, 2, 3, 12, 13, 14, 15, 16, 17, 55, 74, 78, 150, 151, 154, 180, 185 and 194; C.I. Pigment Orange 31 and 43. C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 209 221, 222, 224 and 238; C.I. Pigment Violet 19 and 196; C.I. Pigment Blue 1, 2, 3, 15, 15:1, 15:2, 15:3, 15:4, 16, 22 and 60; C.I. Pigment Green 7 and 36; and solid solutions of these pigments, and the like. The water-based ink of the present disclosure may be made by dispersing the pigments in water using a dispersing agent. For example, common polymer dispersing agents (resins for pigment dispersion, resin dispersing agents) and the like may be used as the dispersing agent, or they may be prepared in-house. The pigments in the water-based ink of the present disclosure may be encapsulated by polymers.

Pigments may be dispersed with a dispersing using, for example, a dispersing device. Dispersing devices used for dispersion of the pigments are not limited so long as they are general dispersion machines, such as ball mills, roll mills, sand mills (for example, high-speed type), and the like.

The pigment may be a self-dispersing pigment. The self-dispersing pigments include those that can be dispersed in water without the use of a dispersing agent, for example, by introducing at least one hydrophilic functional group such as a carbonyl group, hydroxyl group, carboxylic group, sulfonate group, phosphate group, or the like, or salts thereof, directly or via other groups into the pigment particles by chemical bonds. The self-dispersing pigments can be those where a pigment is treated by the methods described in Japanese Unexamined Patent Application Publication No. H8-3498, Japanese PCT Unexamined Patent Application Publication No. 2000-513396, Japanese PCT Unexamined Patent Application Publication No. 2008-524400, Japanese PCT Unexamined Patent Application Publication No. 2009-515007, Japanese PCT Unexamined Patent Application Publication No. 2011-515535, and the like. The contents of these documents are incorporated herein by reference in their entireties. Both inorganic and organic pigments can be used as raw materials for the self-dispersing pigments. Pigments suitable for the above treatment include, for example, carbon blacks such as MA8 and MA100, manufactured by Mitsubishi Chemical Corporation, and the like. The self-dispersing pigments described above may be commercially available, for example. The above commercial products include, for example, CAB-O-JET (registered trademark) 200, CAB-O-JET (registered trademark) 250C, CAB-O-JET (registered trademark) 260M, CAB-O-JET (registered trademark) 270Y, CAB-O-JET (registered trademark) 300, CAB-O-JET (registered trademark) 400, CAB-O-JET (registered trademark) 450C, CAB-O-JET (registered trademark) 465M, CAB-O-JET (registered trademark) 470Y, manufactured by Cabot Corporation; BONJET (registered trademark) BLACK CW-2 and BONJET (registered trademark) BLACK CW-3, manufactured by Orient Chemical Industries Co., LIOJET (registered trademark) WD BLACK 002C, manufactured by Toyo Ink Co., and the like.

One of the pigments may be used alone or in a combination of two or more pigments. Solid content of the pigment based on a total mass of the water-based ink (pigment solid content) is not particularly limited and can be determined accordingly. The pigment solid content is, for example, 0.1 to 20 mass %, 1 to 10 mass %, or 2 to 8 mass %. The pigment solid content is the mass of pigment only and does not include the mass of resin dispersants, or the like (in other words, converted by the amount of active ingredients).

The dyes are not particularly limited, and may include, for example, direct dyes, acid dyes, basic dyes, reactive dyes, food dyes, and the like. Specific examples of dyes include C.I. Direct Black, C.I. Direct Blue, C.I. Direct Red, C.I. Direct Yellow, C.I. Direct Orange, C.I. Direct Violet, C.I. Direct Brown, C.I. Direct Green, C.I. Acid Black, C.I. Acid Blue, C.I. Acid Red, C.I. Acid Yellow, C.I. Acid Orange, C.I. Acid Violet, C.I. Basic Black, C.I. Basic Blue, C.I. Basic Red, C.I. Basic Violet, C.I. Reactive Blue, C.I. Reactive Red, C.I. Reactive Yellow, C.I. Food Black, C.I. Food Red, C.I. Food Yellow, and the like. C.I. Direct Black includes, for example, C.I. Direct Black 17, 19, 22, 31, 32, 51, 62, 71, 74, 108, 112, 113, 146, 154, 168, 195, and the like. Examples of C.I. Direct Blue include C.I. Direct Blue 1, 6, 15, 22, 25, 41, 71, 76, 77, 80, 86, 90, 98, 106, 108, 120, 158, 163, 168, 199, 226, and the like. Examples of C.I. Direct Red include C.I. Direct Red 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, and the like. Examples of the C.I. Direct Yellow include C.I. Direct Yellow 8, 11, 12, 24, 26, 27, 28, 33, 39, 44, 50, 58, 85, 86, 87, 88, 89, 98, 100, 110, 132, 142, 173, and the like. Examples of the C.I. Direct Orange include C.I. Direct Orange 34, 39, 44, 46, 60, and the like. Examples of the C.I. Direct Violet include C.I. Direct Violet 47, 48, and the like. Examples of the C.I. Direct Brown include C.I. Direct Brown 109 and the like. Examples of the C.I. Direct Green include C.I. Direct Green 59 and the like. Examples of the C.I. Acid Black include C.I. Acid Black 2, 7, 24, 26, 31, 48, 51, 52, 63, 110, 112, 115, 118, 156, and the like. Examples of the C.I. Acid Blue include C.I. Acid Blue 1, 7, 9, 15, 22, 23, 25, 29, 40, 43, 59, 62, 74, 78, 80, 90, 93, 100, 102, 104, 117, 120, 127, 138, 158, 161, 167, 220, 234, and the like. Examples of the C.I. Acid Red include C.I. Acid Red 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, and the like. Examples of the C. I. Acid Yellow include C.I. Acid Yellow 1, 3, 7, 11, 17, 23, 25, 29, 36, 38, 40, 42, 44, 61, 71, 76, 98, 99, and the like. Examples of the C.I. Acid Orange include C.I. Acid Orange 7, 19, and the like. Examples of the C.I. Acid Violet include C.I. Acid Violet 49 and the like. Examples of the C.I. Basic Black include C.I. Basic Black 2, and the like. Examples of the C.I. Basic Blue include C.I. Basic Blue 1, 3, 5, 7, 9, 24, 25, 26, 28, 29, and the like. Examples of the C.I. Basic Red include C.I. Basic Red 1, 2, 9, 12, 13, 14, 37, and the like. Examples of the C.I. Basic Violet include C.I. Basic Violet 7, 14, 27, and the like. Examples of the C.I. Reactive Blue include C.I. Reactive Blue 4, 5, 7, 13, 14, 15, 18, 19, 21, 26, 27, 29, 32, 38, 40, 44, 100, and the like. Examples of the C.I. Reactive Red include C.I. Reactive Red 7, 12, 13, 15, 17, 20, 23, 24, 31, 42, 45, 46, 59, and the like. Examples of the C.I. Reactive Yellow include C.I. Reactive Yellow 2, 3, 17, 25, 37, 42, and the like. Examples of the C.I. Food Black include C.I. Food Black 1, 2, and the like. Examples of the C.I. Food Red include C.I. Food Red 87, 92, 94, and the like. Examples of the C.I. Food Yellow include C.I. Food Yellow 3, and the like.

One of the dyes may be used alone or in a combination of two or more dyes. The amount of the dye relative to the total mass of the water-based ink is, for example, 0.1 to 10.0 mass %, 0.2 to 8.0 mass %, or 0.3 to 6.0 mass %.

The water may be ion exchanged water, pure water, or the like. The amount of water to be blended relative to the total mass of the water-based ink (water ratio) is determined in accordance with desired ink characteristics and the like. The water ratio may, for example, be the remainder after the other ingredients. The amount of water is, for example, 50 to 95 mass %, 55 to 90 mass %, or 60 to 80 mass %.

As described above, the water-based ink further contains a penetrating agent and a wetting agent.

The penetrating agent includes diethylene glycol monohexyl ether (DEHE). The DEHE may be commercially available, for example.

The amount of DEHE relative to the total mass of the water-based ink may be, for example, 0.1 to 5.0 mass %, 0.5 to 3.5 mass %, or 1.0 to 2.0 mass %. The amount of DEHE relative to the total mass of the water-based ink should be, for example, more than 1.0 mass % from the perspective of penetration and less than 2.0 mass % from the perspective of storage stability.

The water-based ink may further contain other penetrating agents (penetrating agents other than DEHE) to the extent that the effect described herein is not impaired. The penetrating agents other than DEHE are not limited, and can be, for example, penetrating agents with a standard boiling point of 250° C. or higher, or, as described below, penetrating agents with a standard boiling point of 250° C. or lower. Other penetrating agents include, for example, alkylene diols, glycol ether compounds, and the like. Examples of the alkylene diols include 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 1,6-hexanediol, 2-methyl-2,4-pentanediol, 3-methyl-1,5-pentanediol, and the like. Examples of the glycol ether compounds include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n propyl ether, tripropylene glycol ethyl ether, tripropylene glycol-n-propyl ether, tripropylene glycol-n-butyl ether, and the like.

When the penetrating agent is a combination of two or more penetrating agents including DEHE, the amount of the penetrating agent relative to the total mass of the water-based ink can be selected in accordance with the purpose. The amount of penetrating agent is, for example, 0.1 to 5.0 mass %, 0.5 to 3.5 mass %, or 1.0 to 2.0 mass %.

The water-based ink contains a wetting agent. Examples of the wetting agent include lower alcohols such as methyl alcohol, ethyl alcohol, n-propyl alcohol, isopropyl alcohol, n-butyl alcohol, sec-butyl alcohol and tert-butyl alcohol, and the like; amides such as dimethylformamide, dimethylacetamide, and the like; ketones such as acetone and the like; keto alcohols such as diacetone alcohols and the like; ethers such as tetrahydrofuran, dioxane, and the like; polyhydric alcohols such as polyalkylene glycol, alkylene glycol, and the like; 2-pyrrolidone; N-methyl-2-pyrrolidone; 1,3-dimethyl-2-imidazolidinone, and the like. The polyalkylene glycol is not limited, and examples include polyethylene glycol, polypropylene glycol, and the like. The alkylene glycol is not limited, but examples include ethylene glycol, propylene glycol, butylene glycol, diethylene glycol, triethylene glycol, dipropylene glycol, tripropylene glycol, thiodiglycol, hexylene glycol, and the like. Of these, polyhydric alcohols such as alkylene glycol, and the like are suitable. One type of wetting agent may be used alone, or in a combination of two or more types. The wetting agent may be commercially available, for example.

The water-based ink contains at least a wetting agent with an SP value of 12 to 14 (hereinafter also referred to as a first wetting agent) as a wetting agent. The SP (Solubility Parameter) value is obtained by the Fedors method, for example, using the following equation, and is expressed in units of $(cal/cm^3)^{1/2}$.

$$SP\ value = (\Sigma \Delta ei / \Sigma \Delta vi)^{1/2}$$

Δei: evaporation energy of atoms and atomic clusters (cal/mol)

Δvi: molar volume (cm³/mol)

Examples of the first wetting agent include tripropylene glycol (TPG; SP value=12.1), triethylene glycol (TEG; SP value=13.6), polyethylene glycol with a weight average molecular weight of 190-210 (PEG; SP value=12.8), and the like. The wetting agent with an SP value of 12 to 14 may be commercially available, for example. One type of wetting agent may be used alone, or in a combination of two or more types.

The amount of the first wetting agent relative to the total mass of the water-based ink may be, for example, 0.1 to 20 mass %, 1 to 10 mass %, or 3 to 7 mass %.

For example, the water-based ink contains a wetting agent with an SP value of 12 to 14 or higher (hereinafter also referred to as a second wetting agent) as a wetting agent. The second wetting agent is, for example, glycerin (SP value=20.0) or the like. The amount of glycerin in the total amount of water-based ink can be appropriately selected in accordance with the purpose.

When the wetting agent is a combination of two or more wetting agents including a wetting agent with an SP value of 12 to 14, the amount of the wetting agent relative to the total mass of the water-based ink can be selected based on the objective. The amount of the wetting agent is, for example, 0.1 to 95 mass %, 1 to 80 mass %, or 3 to 50 mass %.

The ratio (AB) of the amount of the wetting agent (A) with an SP value of 12 to 14 to the amount of the DEHE (B) should be 2.5 or higher, for example, 2.5 or more and less than 20, 2.5 or more and less than 15, and 2.5 or more and less than 10. The ratio (AB) may, for example, be greater than 2.5 and less than 5.

The water-based ink contains a penetrating agent including DEHE and a wetting agent with an SP value of 12 to 14, can reduce VOC generation, and has favorable image quality, ejection stability (redispersibility), and storage stability. The mechanism by which VOC generation is reduced while image quality, dispensing stability (redispersibility), and storage stability are all excellent is thought to be, for example, as follows. The DEHE has a standard boiling point of 250° C. or higher, so it is less likely to volatilize into the atmosphere at ambient temperature and pressure, thereby reducing the generation of VOCs. Among ethylene glycol-based penetrating agents, DEHE has a high penetrating performance because it has 6 alkyl carbon atoms and a structure that is more hydrophobic. However, DEHE has low water solubility, which limits the amount of DEHE in the formulation. In other words, if the amount of DEHE is increased to enhance penetration performance, the DEHE will not dissolve, resulting in reduced ejection stability (redispersibility) and storage stability. In contrast, combining DEHE and a wetting agent with an SP value of 12 to 14 in a specific ratio improves compatibility and increases the amount of DEHE, while ensuring ejection stability (redispersion) and storage stability. DEHE can then enhance penetration performance and improve image quality. However, this mechanism is only a hypothesis, and the present disclosure is not limited thereto.

The water-based inks may, for example, contain penetrating agents and wetting agents with standard boiling points of 250° C. or less (hereinafter also referred to as low-boiling-point organic solvents), but preferably they are not included. When low-boiling-point organic solvents are included, it is preferable that the amount of these solvents be less than or equal to the regulatory standard for VOCs. Herein, the regulatory standards for VOCs conform to the standards established in Germany for obtaining the "Blue Angel Mark". Specifically, for example, for color printing, the VOC emission per unit time (VOC generation) is preferably 18 mg/h or less, and for monochrome printing, the VOC emission per unit time is preferably 10 mg/h or less. The amount of VOCs emitted per unit time can be determined, for example, from the total amount of volatile organic compounds released during continuous printing for approximately 5 minutes or longer in a constant-temperature oven (conditions: temperature 23° C., relative humidity 50%).

When a low-boiling-point organic solvent is included, it is preferable to conduct printing with a reduced amount of ink (ejection amount) (ink volume reduced printing). This reduces the amount of the water-based ink used, thereby reducing VOC emissions. On the other hand, if a low-boiling-point organic solvent is not included, VOC emissions are reduced even when printing such that the amount of ink used is not reduced (normal printing).

The water-based ink may, for example, further contain a surfactant.

The surfactant is not limited and may be selected in accordance with the purpose, and for example, commercially available products may be used. Specifically, the surfactant includes, for example, silicone surfactants, acetylene surfactants, and the like.

Examples of commercially available silicone surfactants include SILFACE (registered trademark) SAG002, SILFACE (registered trademark) SAG005, and SILFACE (registered trademark) SAG503A, and the like, manufactured by Nissin Chemical Industry Co.

Commercial acetylene surfactants include: OLFINE (registered trademark) E1004, OLFINE (registered trademark) E1008, and OLFINE (registered trademark) E1010 manufactured by Nissin Chemical Industry; SURFINOL (registered trademark) 440, SURFINOL (registered trademark) 465, and SURFINOL (registered trademark) 485 manufactured by Air Products and Chemicals, Inc.; ACETYLENOL (registered trademark) E40 and ACETYLENOL (registered trademark) E100 manufactured by Kawaken Fine Chemicals Co., and the like.

The water-based ink may contain other surfactants in addition to or as a substitute for the silicone surfactants and acetylene surfactants. Examples of other surfactants include nonionic surfactants manufactured by Kao Corporation including the EMULGEN (registered trademark) series, RHEODOL (registered trademark) series, EMASOL (registered trademark) series, EXCEL (registered trademark) series, EMANON (registered trademark) series, AMIET (registered trademark) series, and AMINON (registered trademark) series and the like; nonionic surfactants manufactured by Toho Chemical Industries Co. such as Solvon (registered trademark) series and the like; nonionic surfactants manufactured by Lion Corporation such as DOBANOX (registered trademark) series, LEOCOL (registered trademark) series, LEOX (registered trademark) series, LAOL, LEOCOL (registered trademark) series, LIONOL (registered trademark) series, CADENAX (registered trademark) series, LIONON (registered trademark) series, LEOFAT (registered trademark) series, and the like; anionic surfactants manufactured by Kao Corporation such as the EMAL (registered trademark) series, LATEMUL (registered trademark) series, VENOL (registered trademark) series, NEOPELEX (registered trademark) series, NS SOAP, KS SOAP, OS SOAP, PELEX (registered trademark) series, and the like; anionic surfactants manufactured by Lion Corporation such as the LIPOLAN (registered trademark) series, LIPON (registered trademark) series, SUNNOL (registered trademark) series, LIPOTAC (registered trademark) TE, ENAGICOL series, LIPAL (registered trademark) series and LOTAT (registered trademark) series, and the like; and cationic surfactants manufactured by DKS Co. such as CATIOGEN (registered trademark) ES-OW and CATIOGEN (registered trademark) ES-L, and the like.

One type of surfactant may be used alone, or in a combination of two or more types.

The amount of surfactant relative to the total mass of the water-based ink can be appropriately selected in accordance with the purpose. The amount of surfactant is, for example, 0.1 to 5.0 mass %, 0.25 to 3 mass %, or 0.5 to 2.0 mass %. Note that the amount of surfactant herein is the sum of the amounts of two or more surfactants.

The water-based ink may also contain conventionally known additives as needed. The additives include, for example, pH adjusting agents, viscosity adjusting agents, surface tension adjusting agents, anti-mold agents, and the like. Examples of the viscosity adjusting agent include polyvinyl alcohol, cellulose, water-soluble resins, and the like.

An ink storage container according to the present disclosure is an ink container that contains a water-based ink for inkjet recording, and the water-based ink is the water-based ink for inkjet recording according to the present disclosure. Examples of ink storage containers include ink cartridges, tanks, pouches, and the like. The main body of the ink storage container may be a conventionally known container main body, for example.

Next, inkjet recording devices and inkjet recording methods will be described.

In embodiments, the inkjet recording device of the present disclosure is an inkjet recording device that includes an ink storage container and ink ejecting part, and the ink contained in the ink storage container part is ejected by the ink ejecting part. The water-based ink for inkjet recording of the present disclosure is stored in the ink storage container.

The FIGURE illustrates an exemplary configuration of an inkjet recording device of the present disclosure. As illustrated in the drawing, an inkjet recording device 1 includes four ink storage containers (ink cartridge 2), an ink ejecting part (inkjet head) 3, a head unit 4, a carriage 5, a drive unit 6, a platen roller 7, and a purging device 8 as major components. The inkjet recording device may optionally include a controlling part 9 (CPU, GPU, and the like) as an optional configuration.

The four ink cartridges 2 contain four colors of water-based ink, one each of yellow, magenta, cyan, and black. For example, at least one of the four water-based inks is the water-based ink of the present disclosure. The FIGURE shows a set of four ink cartridges 2, but instead, an integrated ink cartridge may be used, having the interior partitioned to form a water-based yellow ink storage container, a water-based magenta ink storage container, a water-based cyan ink storage container part, and a water-based black ink storage container part. The main body of the ink cartridge may be a conventionally known cartridge main body, for example.

The inkjet head 3 installed in the head unit 4 records on a recording medium (for example, recording paper) P. The four ink cartridges 2 and the head unit 4 are mounted on the carriage 5. The drive unit 6 moves the carriage 5 back and forth in a straight line direction. The drive unit 6 may be any conventionally known drive unit, for example (see, for example, Japanese Unexamined Patent Application Publication No. 2008-246821). The contents of this document are incorporated herein by reference in their entireties. The platen roller 7 extends in a reciprocating direction of carriage 5 and is disposed facing the inkjet head 3.

The controlling part 9 is responsible for the overall control of the inkjet recording device. In the inkjet recording device, various programs are executed by the controlling part 9, for example, and various information is read and written. The controlling part 9 functions, for example, as a determining part 91 and an image processing part 92.

The determining part 91 determines whether the condition of the inkjet recording device meets specific conditions. The specific conditions are not limited, but for example, the controlling part 9 determines that a specific condition is satisfied when at least one of the following is indicated: the supply of ink from the ink storage container to the inkjet head 3 is delayed; the user has given instructions to reduce the amount of ink; the amount of ink remaining is low; or a large amount of ink is used when printing based on the received image data. For example, the determining part 91 determines the ejecting mode to be either the first ejecting mode or the second ejecting mode (third or fourth ejecting mode), as described below, based on the above determination, and drives the inkjet head 3 to eject the water-based ink to perform the inkjet recording operation.

The image processing part 92 performs image processing on the received image data. The image processing part 92 reduces the amount of water-based ink ejected in the second ejecting mode from the amount of water-based ink ejected in the first ejecting mode by changing the parameters of image processing of the first ejecting mode.

Image processing of the received image data in the image processing part 92 is described below. When image data is received, the inkjet recording device 1 performs image processing including color conversion processing, color tone adjustment processing, ink volume regulation processing, halftone processing, interlace processing, and the like. Color conversion processing, for example, is a process of converting image data, which is RGB pixel data containing bitmap data, is converted into CMYK pixel data expressing the pixel color by the gradation values (for example, 256 gradations) of the four elements of ink colors used for the recording, such as cyan (C), magenta (M), yellow (Y), and black (K). The above conversion is performed, for example, using a look-up table that maps RGB pixel data to CMYK pixel data. The color adjustment processing is, for example, a process of performing calibration processing. The calibration processing corrects the value of each element of CMYK pixel data such that the density of the color actually recorded on the recording medium changes linearly with the change in the value of each element of CMYK pixel data before color correction processing. Calibration can reduce the difference in color density due to the above mentioned characteristics. The ink volume adjustment process is, for example, a process to adjust the value of each element of each corrected CMYK pixel data such that the ejection volume (also called ink volume) of the water-based ink required for recording is less than the standard volume. The halftone processing is performed using known methods, such as dither and error diffusion methods and the like, for example. The interlace processing is, for example, a process of setting an interlacing method to be performed by the inkjet recording device.

The inkjet head 3 may, for example, select either the "first ejecting mode" or the "second ejecting mode" with respect to the ejecting operation of the water-based ink to perform recording. When the second ejecting mode is selected, the inkjet head 3 may, for example, select either the "third ejecting mode" or the "fourth ejecting mode" to perform recording. Specifically, when the determining part 91 determines that specific conditions are not satisfied, the inkjet head 3 receives a command from the controlling part 9 to perform the recording in the first ejecting mode, in which the inkjet head 3 ejects the water-based ink for inkjet recording based on the received image data. The first ejecting mode is also referred to as, for example, normal printing mode. On the other hand, if the determining part 91 determines that the specific conditions are satisfied, the inkjet head 3 receives a command from the controlling part 9 and executes the recording in the second ejecting mode. The second ejecting mode is a mode in which the ejection volume of the water-based ink for inkjet recording is reduced, as compared to the first ejecting mode. In other words, when the same image data is received, the amount of ink used for ejecting in the second ejecting mode is less than the amount of ink used for ejecting in the first ejecting mode.

The second ejecting mode may include at least one of a third and fourth ejecting modes. The inkjet head 3 performs the recording in at least one of the third and fourth ejecting modes, for example, based on user selection.

The third ejecting mode is a mode in which the recording duty in the first ejecting mode is changed to eject water-based ink, for example, and is also referred to as duty changing mode. Changing the recording duty is performed by changing a dot size of at least a portion of dots formed by the water-based ink for inkjet recording that lands on a recording medium in the first ejecting mode. Changing the recording duty in the second ejecting mode will be described in more detail. The droplets ejected by the inkjet head 3 land on the recording medium. The inkjet head 3 may, for example, eject a plurality of droplets in succession at the same point on the recording medium. The dot size of the droplets that land on the recording medium can be classified, for example, into S size, M size, and L size, depending on the size. The classification criteria for each size is not limited and can be set arbitrarily. The dot size can be measured, for example, using known methods. The recording duty can be adjusted by the ratio of the dot size, for example, the ratio of S-size, M-size, and L-size droplets. The dot size and the ratio can be changed, for example, by changing the halftone processing parameters as the image processing parameters. If at least a portion of the dot sizes change as described above, the ratios will change, and the recording duty will also change. Thus, in the third ejecting mode, the dot size is changed, and the recording duty is adjusted to enable printing with reduced ink volume.

The fourth ejecting mode is a mode in which the ejection volume of the water-based ink for inkjet recording in the first ejecting mode is changed by changing the characteristics inherent in the inkjet recording device 1. The fourth ejecting mode is also referred to as ink saving printing mode or high-speed mode, for example. In the fourth ejecting mode, a reduction of the ejection volume of water-based ink is possible, for example, by changing the parameters of the color tone adjustment processing (for example, the parameters of the calibration processing, which are characteristic values unique to the inkjet recording device) as parameters of the image processing. The characteristic value is unique to each individual inkjet recording device, and changing this characteristic value can change the printed color tone, and the like. The characteristic values are, for example, stored in advance in the inkjet recording device. Other characteristic values include, for example, head characteristic values. The head characteristic value is a value based on the mechanical misalignment and ejection variation (for example, variation in ejection rate and direction) of a plurality of ink ejection ports provided on the inkjet head 3. If there is mechanical misalignment or ejection variation in a plurality of ink ejection ports, the effect of such misalignment or variation may appear in the printing results. Thus, in the fourth ejecting mode, the amount of water-based ink ejected is changed during the calibration processing to enable printing with reduced ink volume.

The water-based inks in the first ejecting mode, second ejecting mode, third ejecting mode and fourth ejecting mode are all water-based inks for inkjet recording of the present disclosure. The inkjet head 3 capable of executing the first, second, third, and fourth ejecting modes can, for example, be a conventionally known head (see, for example, Japanese Unexamined Patent Application Publication No. 2002-36599, Japanese Unexamined Patent Application Publication No. 2020-044679, and Japanese Unexamined Patent Application Publication No. 2020-131576). The contents of these documents are incorporated herein by reference in their entireties. Thereby, ink volume reduction printing is possible (recording in the second ejecting mode (third and fourth ejecting modes)).

The purging device 8 suctions out defective ink containing air bubbles and the like that accumulate inside the inkjet head 3. For example, a conventionally known purging device can be used as the purging device 8 (see, for example, Japanese Unexamined Patent Application Publication No. 2008-246821).

A wiper member 20 is provided on the platen roller 7 side of the purging device 8, adjacent to the purging device 8. The wiper member 20 is formed in the shape of a spatula, and wipes a nozzle forming surface of the inkjet head 3 as the carriage 5 moves. In the FIGURE, a cap 18 covers a plurality of nozzles of the inkjet head 3 when the head has returned to the reset position after recording is finished, in order to prevent the water-based ink from drying out.

As described above, in the inkjet recording device 1 shown in the FIGURE, the four ink cartridges 2 and the head unit 4 are mounted on one carriage 5. However, the present disclosure is not limited thereto. In the inkjet recording device 1, each of the four ink cartridges 2 may be mounted on a carriage separate from the head unit 4. Each of the four ink cartridges 2 may be provided and secured in the inkjet recording device 1, rather than being mounted on the carriage 5. In these embodiments, for example, each of the four ink cartridges 2 and the head unit 4 mounted on the carriage 5 are connected by tubing or the like, and the water-based ink is supplied from each of the four ink cartridges 2 to the head unit 4. Furthermore, in these embodiments, four ink bottles in bottle form may be used instead of the four ink cartridges 2. In this case, it is preferable that the ink bottle has an injection port for injection ink from the outside into the inside.

Inkjet recording using this inkjet recording device 1 is performed, for example, as follows. First, the recording paper P is fed from a paper feeding cassette (not illustrated) provided on the side or below the inkjet recording device 1. The recording paper P is introduced between the inkjet head 3 and the platen roller 7. Predetermined recording is performed on the introduced recording paper P by the water-based ink ejected from the inkjet head 3. Ejecting may be performed, for example, by the "first ejecting mode" or the "second ejecting mode (at least one of the third or fourth ejecting modes)," depending on the determination of the determining part 91, as described above. After recording, the recording paper P is ejected from the inkjet recording device 1. In the FIGURE, paper feeding and paper ejecting mechanisms for the recording paper P are omitted.

The device illustrated in the FIGURE uses a serial inkjet head, but the present disclosure is not limited thereto. The inkjet recording device may be a line inkjet head or a roller-to-roller device.

In embodiments, the inkjet recording method of the present disclosure is an inkjet recording method that includes a recording step in which water-based ink is ejected onto the recording medium by an inkjet method, and in the recording step, the water-based ink for inkjet recording of the present disclosure is used as the water-based ink. The inkjet recording method of the present disclosure can be performed, for example, using the inkjet recording device of the present disclosure. The recording includes printing, text printing, image printing, and the like.

The inkjet recording method of the present disclosure may include, for example, a determining step and an image processing step as optional components. The determining step determines whether the condition of the inkjet recording device meets specific conditions. The image processing step performs image processing of the received image data. The determining step can be performed, for example, by the determining part 91, and the image processing step can be performed, for example, by the image processing part 92.

If a determination is made, the recording step may, for example, select either the "first ejecting mode" or the "second ejecting mode" and perform recording. If the second ejecting mode is selected, the recording step may, for example, select either the "third ejecting mode" or the "fourth ejecting mode" to perform recording. The first ejecting mode, second ejecting mode, third ejecting mode, and fourth ejecting mode are the same as described above. Specifically, when it is determined that the specific conditions are not met in the determining process, the inkjet head 3 receives a command from the controlling part 9 and performs recording in the first ejecting mode based on the received image data. On the other hand, if it is determined in the determining step that the specific conditions are satisfied, the inkjet head 3 receives a command from the controlling part 9 and performs the recording in the second ejecting mode. In the second ejecting mode, for example, at least one of the third ejecting mode and the fourth ejecting mode is selected by the user. The inkjet head 3 then performs the recording in the selected mode, for example. The water-based inks in the first ejecting mode, second ejecting mode, third ejecting mode and fourth ejecting mode are all water-based inks for inkjet recording of the present disclosure.

EXAMPLES

Examples according to the present disclosure, together with comparative examples, are described below. The invention(s) described herein are not intended to be limited or restricted by the examples and comparative examples.

[Preparation of Pigment Dispersion Liquid A]

Pure water was added to a mixture of a pigment (C.I. Pigment blue 15:3) and a sodium hydroxide neutralized product of a styrene-acrylic acid copolymer (acid value of 50 mg KOH/g, molecular weight of 10,000) and stirred to obtain a further mixture including 20 mass % of the pigment and 7 mass % of the styrene-acrylic acid copolymer based a total of 100 mass %. The resulting mixture was placed in a wet sand mill filled with 0.3 mm diameter zirconia beads and dispersed for 6 hours. Afterwards, the zirconia beads were removed by a separator and filtered through a 3.0 μm pore diameter cellulose acetate filter to obtain Pigment Dispersion Liquid A. The styrene-acrylic acid copolymer was a water-soluble polymer generally used as a pigment dispersing agent.

Examples 1 to 5, 7, 8 and Comparative Examples 1 to 5

Components of each water-based ink composition shown in Table 2 below, except for the pigment dispersion liquid, were uniformly mixed to obtain an ink solvent. Next, the ink solvent was added to Pigment Dispersion Liquid A and mixed uniformly. The resulting mixture was then filtered through a cellulose acetate-type membrane filter (pore diameter 3.00 μm) manufactured by Toyo Roshi Kaisha to obtain the water-based inks for inkjet recording of Examples 1 to 5, 7 and 8 and Comparative Examples 1 to 8.

Example 6

Each component of the water-based ink composition shown in Table 1 was mixed uniformly. The resulting mixture was then filtered through a polytetrafluoroethylene (PTFE) type membrane filter (pore diameter: 0.20 μm) manufactured by Toyo Roshi Kaisha to obtain the water-based ink for inkjet recording in Example 6.

(a) Image quality evaluation during normal printing, (b) storage stability evaluation, (c) ejection stability (redispersibility) evaluation, and (d) VOC generation evaluation were conducted on the water-based inks of Examples 1 to 8 and Comparative Examples 1 to 8 by the following methods.

(a) Image Quality Evaluation with Normal Printing

Solid images were recorded on plain paper ("Multi Paper Super White+" by ASKUL) using an MFC-J6580CDW inkjet printer manufactured by Brother Industries, Ltd. and ejecting the water-based inks of each the water-based inks of the examples and comparative examples. The solid images were visually observed and evaluated for unevenness in the form of white streaking (banding) according to the following evaluation criteria.

—Image Quality Evaluation Criteria with Normal Printing—

A: No white streaky unevenness (banding) was observed in the solid image.

B: Uneven white streaking (banding) was observed in a portion of the solid image.

C: Uneven white streaking (banding) was observed in all of the solid image.

(b) Storage Stability Evaluation

Evaluation samples for each the water-based inks of the examples and comparative samples were prepared by, immediately after preparation, measuring the viscosities of the respective water-based inks and placing the respective water-based inks were in a sealed container and stored for two weeks at a temperature of 60° C. and a relative humidity of 40%. The evaluation samples were visually checked; their viscosities were measured; and their storage stabilities were evaluated according to the following evaluation criteria. The viscosity was measured at 25° C. using a viscometer (TVE-25 made by Toki Sangyo Co.).

—Storage Stability Evaluation Criteria—

A: No floating oil layer and no increase in viscosity compared with immediately after preparation.

B: Floating oil layer is present but no increase in viscosity is seen compared with immediately after preparation.

C: Floating oil layer is present and an increase in viscosity is seen compared with immediately after preparation.

(c) Evaluation of Ejection Stability (Redispersibility)

12 μL of each of the water-based ink of the examples and comparative examples was dropped onto a glass slide. The glass slides were then stored at 60° C. and 40% relative humidity for two weeks to allow the water-based ink to evaporate and solidify to obtain solids. Next, 1 mL of pure water was dropped onto the solids to evaluation samples. The evaluation samples prepared in this manner were visually observed for the presence of residue; and their redispersibility was evaluated according to the following evaluation criteria.

—Evaluation Criteria of Ejection Stability (Redispersibility)—

A: Solids were uniformly redispersed (dissolved or dispersed in pure water) in drops of pure water, and no residue was observed.

C: Residue was observed with or without redispersion.

(d) Evaluation of VOC Generation

The degree of VOC generation was evaluated for each of the water-based inks of the examples and comparative examples according to the following evaluation criteria.

—VOC Generation Evaluation Criteria—

A: The boiling point of all penetrating agents and wetting agents in the water-based ink is 250° C. or higher.

C: The boiling point of at least one penetrating agent or wetting agent in the water-based ink was less than 250° C.

The water-based ink compositions and evaluation results of the water-based inks of Examples 1 to 8 and Comparative Examples 1 to 8 are shown in Table 2. In the table, the number following polyethylene glycol refers to the weight average molecular weight.

TABLE 1

| | | | SP value | Boiling Point | Examples 1 | Examples 2 | Examples 3 | Examples 4 | Examples 5 | Examples 6 |
|---|---|---|---|---|---|---|---|---|---|---|
| Water-based ink composition (mass %) | Colorant | Pigment dispersion liquid A (*1) | — | — | 3.5 | 3.5 | 3.5 | 3.5 | 3.5 | — |
| | | C.I. Direct Blue 199 | — | — | — | — | — | — | — | 3.5 |
| | Penetrating agent (B) | Diethylene glycol monohexyl ether | — | 263 | 1.2 | 1.2 | 1.2 | 2.0 | 1.0 | 1.2 |
| | | Diethylene glycol-2-ethylhexyl ether | — | 272 | — | — | — | — | — | — |
| | | Polyethylene glycol monobutyl ether | — | 290-310 | — | — | — | — | — | — |
| | | Triethylene glycol monobutyl ether | — | 272 | — | — | — | — | — | — |
| | | Hexyldiglycol | — | 208 | — | — | — | — | — | — |
| | Wetting agent | Glycerin (86%) | 20.0 | 290 | 22.0 | 22.0 | 22.0 | 22.0 | 22.0 | 22.0 |
| | | Tripropylene glycol (A) | 12.1 | 273 | — | 5.0 | — | 5.0 | 5.0 | — |
| | | Triethylene glycol (A) | 13.6 | 298 | 5.0 | — | — | — | — | 5.0 |
| | | Polyethylene glycol 200 (A) | 12.8 | >250 | — | — | 5.0 | — | — | — |
| | | Polyethylene glycol 600 | 10.5 | >250 | — | — | — | — | — | — |
| | Surfactant | OLFINE® E1010 (*2) | — | — | 0.5 | 0.5 | 0.5 | 0.5 | 0.5 | 0.5 |
| | | Silface (Registered trademark) SAG002 (*3) | — | — | — | — | — | — | — | — |
| | | Silface (Registered trademark) SAG503A (*4) | — | — | — | — | — | — | — | — |
| | Fixing resin | Joncryl (Registered trademark) 70 (*5) | — | — | 0.5 | 0.5 | 0.5 | 0.5 | 0.5 | 0.5 |
| | pH adjusting agent | Triethanolamine | — | 335 | 0.2 | 0.2 | 0.2 | 0.2 | 0.2 | 0.2 |
| | Anti-mold agent | PROXEL GXL(S)(*6) | — | — | 0.1 | 0.1 | 0.1 | 0.1 | 0.1 | 0.1 |
| | Water | | — | — | Remainder | Remainder | Remainder | Remainder | Remainder | Remainder |
| A/B | | | | | 4.2 | 4.2 | 4.2 | 2.5 | 5.0 | 4.2 |
| Image quality evaluation with normal printing | | | | | A | A | A | A | B | A |
| Storage stability evaluation | | | | | A | A | B | B | A | A |
| Evaluation of ejection stability (redispersibility) | | | | | A | A | A | A | A | A |
| Evaluation of VOC generation | | | | | A | A | A | A | A | A |

| | | | SP value | Boiling Point | Examples 7 | Examples 8 | Comparative Examples 1 | Comparative Examples 2 | Comparative Examples 3 |
|---|---|---|---|---|---|---|---|---|---|
| Water-based ink composition (mass %) | Colorant | Pigment dispersion liquid A (*1) | — | — | 3.5 | 3.5 | 3.5 | 3.5 | 3.5 |
| | | C.I. Direct Blue 199 | — | — | — | — | — | — | — |
| | Penetrating agent (B) | Diethylene glycol monohexyl ether | — | 263 | 1.2 | 1.2 | — | — | — |
| | | Diethylene glycol-2-ethylhexyl ether | — | 272 | — | — | — | — | 1.2 |
| | | Polyethylene glycol monobutyl ether | — | 290-310 | — | — | — | 1.2 | — |
| | | Triethylene glycol monobutyl ether | — | 272 | — | — | 1.2 | — | — |
| | | Hexyldiglycol | — | 208 | — | — | — | — | — |
| | Wetting agent | Glycerin (86%) | 20.0 | 290 | 22.0 | 22.0 | 22.0 | 22.0 | 22.0 |
| | | Tripropylene glycol (A) | 12.1 | 273 | — | — | — | — | — |
| | | Triethylene glycol (A) | 13.6 | 298 | 5.0 | 5.0 | 5.0 | 5.0 | 5.0 |
| | | Polyethylene glycol 200 (A) | 12.8 | >250 | — | — | — | — | — |
| | | Polyethylene glycol 600 | 10.5 | >250 | — | — | — | — | — |
| | Surfactant | OLFINE® E1010 (*2) | — | — | — | — | 0.5 | 0.5 | 0.5 |
| | | Silface (Registered trademark) SAG002 (*3) | — | — | 0.5 | — | — | — | — |

TABLE 1-continued

|  |  |  |  |  |  |  |  |  |
|---|---|---|---|---|---|---|---|---|
|  |  | Silface (Registered trademark) SAG503A (*4) | — | — | 0.5 | — | — | — |
| Fixing resin |  | Joncryl (Registered trademark) 70 (*5) | — | — | 0.5 | 0.5 | 0.5 | 0.5 | 0.5 |
| pH adjusting agent |  | Triethanolamine | — | 335 | 0.2 | 0.2 | 0.2 | 0.2 | 0.2 |
| Anti-mold agent |  | PROXEL GXL(S)(*6) | — | — | 0.1 | 0.1 | 0.1 | 0.1 | 0.1 |
|  |  | Water | — | — | Remainder | Remainder | Remainder | Remainder | Remainder |
|  |  | A/B |  |  | 4.2 | 4.2 | 4.2 | 4.2 | 4.2 |
| Image quality evaluation with normal printing |  |  |  |  | A | A | C | C | A |
| Storage stability evaluation |  |  |  |  | A | A | A | A | B |
| Evaluation of ejection stability (redispersibility) |  |  |  |  | A | A | A | A | C |
| Evaluation of VOC generation |  |  |  |  | A | A | A | A | A |

| | | | SP value | Boiling Point | Comparative Examples | | | | |
|---|---|---|---|---|---|---|---|---|---|
| | | | | | 4 | 5 | 6 | 7 | 8 |
| Water-based ink composition (mass %) | Colorant | Pigment dispersion liquid A (*1) | — | — | 3.5 | 3.5 | 3.5 | 3.5 | 3.5 |
| | | C.I. Direct Blue 199 | — | — | — | — | — | — | — |
| | Penetrating agent (B) | Diethylene glycol monohexyl ether | — | 263 | 1.2 | 1.2 | — | 0.5 | 2.5 |
| | | Diethylene glycol-2-ethylhexyl ether | — | 272 | — | — | — | — | — |
| | | Polyethylene glycol monobutyl ether | — | 290-310 | — | — | — | — | — |
| | | Triethylene glycol monobutyl ether | — | 272 | — | — | — | — | — |
| | | Hexyldiglycol | — | 208 | — | — | 1.2 | — | — |
| | Wetting agent | Glycerin (86%) | 20.0 | 290 | 22.0 | 22.0 | 22.0 | 22.0 | 22.0 |
| | | Tripropylene glycol (A) | 12.1 | 273 | — | — | — | — | — |
| | | Triethylene glycol (A) | 13.6 | 298 | — | — | 5.0 | 5.0 | 5.0 |
| | | Polyethylene glycol 200 (A) | 12.8 | >250 | — | — | — | — | — |
| | | Polyethylene glycol 600 | 10.5 | >250 | — | 5.0 | — | — | — |
| | Surfactant | OLFINE ® E1010 (*2) | — | — | 0.5 | 0.5 | 0.5 | 0.5 | 0.5 |
| | | Silface (Registered trademark) SAG002 (*3) | — | — | — | — | — | — | — |
| | | Silface (Registered trademark) SAG503A (*4) | — | — | — | — | — | — | — |
| | Fixing resin | Joncryl (Registered trademark) 70 (*5) | — | — | 0.5 | 0.5 | 0.5 | 0.5 | 0.5 |
| | pH adjusting agent | Triethanolamine | — | 335 | 0.2 | 0.2 | 0.2 | 0.2 | 0.2 |
| | Anti-mold agent | PROXEL GXL(S)(*6) | — | — | 0.1 | 0.1 | 0.1 | 0.1 | 0.1 |
| | | Water | — | — | Remainder | Remainder | Remainder | Remainder | Remainder |
| | | A/B | | | 0.0 | 0.0 | 4.2 | 10.0 | 2.0 |
| Image quality evaluation with normal printing | | | | | A | B | B | C | A |
| Storage stability evaluation | | | | | C | B | A | A | C |
| Evaluation of ejection stability (redispersibility) | | | | | C | C | A | A | A |
| Evaluation of VOC generation | | | | | A | A | C | A | A |

(*1): Water dispersion of C.I. Pigment Blue 15:3 (containing resin dispersing agent): Numbers in the table indicate pigment solid content
(*2): Acetylene glycol surfactant: Nissin Chemical Industry Co.: Numbers in the table indicate blended amounts.
(*3): Silicone-based surfactant: Nissin Chemical Industry Co.: Numbers in the table indicate blended amounts.
(*4): Silicone-based surfactant: Nissin Chemical Industry Co.: Numbers in the table indicate blended amounts.
(*5): Acryl styrene resin: BASF (formerly Johnson Polymer Co., Ltd.): Numbers in the table indicate blended amounts.
(*6): Arch Chemicals, Inc.

As shown in Table 1, the evaluation results for image quality, ejection stability, and storage stability with normal printing were "B" or better for Examples 1 to 8. In addition, the VOC generation scores for Examples 1 to 8 were favorable, with a score of "A". Examples 1 and 2, in which the wetting agent is at least one of triethylene glycol and tripropylene glycol, had more favorable storage stability evaluation results than Example 3, which had the same compositions except that the wetting agent was polyethylene glycol with a weight average molecular weight of 200. Example 2, in which the amount of DEHE exceeds 1.0 mass % and is less than 2.0 mass % and the ratio (A/B) is greater than 2.5 and less than 5, had more favorable storage stability than Example 4, in which the same conditions were applied except that the amount of DEHE is 2.0 mass % and the ratio (A/B) is 2.5. Example 2 had more favorable image quality with normal printing than Example 5, which had the same conditions except that the amount of DEHE was 1.0 mass % and the ratio (A/B) was 5.

On the other hand, Comparative Examples 1 to 3, which did not use diethylene glycol monohexyl ether as the penetrating agent, yielded evaluation results for either image quality or storage stability that were inferior. Comparative Example 6 also yielded inferior results for VOC generation evaluation. Comparative Examples 4 and 5, which did not use a wetting agent with an SP value of 12 to 14, yielded at least one of the evaluation results for ejection stability or storage stability that was inferior. Comparative Example 7, in which the ratio (A/B) was 10, yielded inferior image quality evaluation results. Comparative Example 8, in which the ratio (A/B) was 2.0, yielded inferior storage stability evaluation results.

Next, image quality evaluation with reduced ink volume printing using the water-based inks in Examples 1, 4, 5, and Comparative Example 1 was performed by the following method.

(e) Image Quality Evaluation with Reduced Ink Volume Printing (e1) Optical Density (OD Value) Evaluation Evaluation samples for each Examples 1, 4, 5 and Comparative Example 1 were prepared by recording images on plain paper ("Multi Paper Super White+" by ASKUL) using an MFC-J6580CDW inkjet printer manufactured by Brother Industries, Ltd. and ejecting the respective water-based inks in printing modes 1 to 6 as described below. The optical density (OD value) at three locations on each evaluation sample was measured using a spectrophotometer SpectroEye (light source: D50, viewing angle: 2°, ANSI-T) manufactured by X-Rite, and the average value was obtained. Next, by comparing printing mode 1 with printing mode 2, printing mode 1 with printing mode 3, and printing mode 4 with printing mode 5, the OD value reduction rate (%) when changing from 100% recording duty to 70% recording duty based on printing mode 1 or printing mode 4 was determined using the following formula (1). Further, by comparing printing mode 1 with printing mode 4, the OD value reduction rate (%) when the amount of one droplet was reduced at 100% recording duty, with respect to printing mode 1, was also calculated using the following equation (1). Note that a smaller value for the OD value reduction rate indicates less degradation of image quality.

$$\text{OD value reduction rate } (\%) = \{(X1-Y1)/X1\} \times 100 \quad (1)$$

X1: OD value in reference printing mode
Y1: OD value in the printing mode with which the reference printing mode was compared The six printing modes were as follows. In the following, using printing mode 1 as a reference, printing mode 1 corresponded to a normal printing mode (first ejecting mode), printing modes 2 and 3 corresponded to duty changing modes (third ejecting mode), printing mode 4 corresponded to an ink saving printing mode (fourth ejecting mode), and printing modes 5 and 6 corresponded to a combination of duty changing mode (third ejecting mode) and ink saving printing mode (fourth ejecting mode). These printing modes can be performed by changing the settings in the inkjet printer as described above. Specifically, printing mode 1 was a mode set to print without selecting a mode on the inkjet printer (mode not selected) and at 100% recording duty. The printing modes 2 and 3 were similar to printing mode 1, except that the recording duty setting was changed. The printing mode 4 was a mode where "high speed mode" on the inkjet printer was selected, and the recording duty was set to 100% recording duty. The printing modes 5 and 6 were similar to printing mode 4, except that the recording duty setting was changed. The "high-speed mode" was a mode in which the characteristic values of the inkjet printer were changed to print with a reduced amount of water-based ink compared with the amount of water-based ink ejected in the non-selected mode, without changing the recording duty.

Printing mode 1: Recording Duty 100%, mode not selected
Printing mode 2: Recording Duty 70%, mode not selected
Printing mode 3: Recording Duty 40%, mode not selected
Printing mode 4: Recording Duty 100%, high speed mode
Printing mode 5: Recording Duty 70%, high speed mode
Printing mode 6: Recording Duty 40%, high speed mode (e2) Cyan Saturation Evaluation The saturation (C*) of three locations on each evaluation sample was measured using a SpectroEye spectrophotometer manufactured X-Rite, and the average value was obtained. Next, by comparing printing mode 1 with printing mode 2 and printing mode 4 with printing mode 5, the saturation (C*) reduction rate (%) when changing from 100% recording duty to 70% recording duty based on printing mode 1 or printing mode 4 was determined using the following formula (2). Further, by comparing printing mode 1 with printing mode 4, the saturation (C*) reduction rate (%) when the amount of one droplet is reduced at 100% recording duty, with respect to printing mode 1 was also calculated using the following equation (2). Note that a smaller value for the saturation (C*) reduction rate indicates less degradation of image quality.

$$\text{Saturation } (C^*) \text{ reduction rate } (\%) = \{(X2-Y2)/X2\} \times 100 \quad (2)$$

X2: Saturation (C*) in reference printing mode
Y2: Saturation (C*) in the printing mode with which the reference printing mode was compared Evaluation results for the water-based inks of Examples 1, 4, and 5 and Comparative Example 1 are shown in Table 3. The water-based ink composition of each of the water-based ink of Examples 1, 4, 5 and Comparative Example 1 is the same as the ink composition shown in Table 2, and thus is omitted In Table 3.

TABLE 2

| | | Examples | | | | | | | | | | |
|---|---|---|---|---|---|---|---|---|---|---|---|---|
| | | 1 | | | | | | 4 | | | | |
| Printing mode | | 1 | 2 | 3 | 4 | 5 | 6 | 1 | 2 | 3 | 4 | 5 | 6 |
| OD value | | 0.94 | 0.64 | 0.36 | 0.84 | 0.64 | 0.40 | 0.95 | 0.66 | 0.38 | 0.86 | 0.67 | 0.42 |
| Saturation (C*) | | 45.4 | 39.3 | 26.6 | 45.1 | 39.4 | 28.8 | 46.6 | 40.6 | 28.1 | 46.2 | 40.3 | 30.0 |

TABLE 2-continued

|  | | | | | | | | | | | | |
|---|---|---|---|---|---|---|---|---|---|---|---|---|
| (printing mode 1 vs. printing mode 2) | | | | | | | | | | | | |
| OD reduction rate (%) | 32% | | | | | | 30% | | | | | |
| Saturation (C*) reduction rate (%) (printing mode 1 vs. printing mode 3) | 13% | | | | | | 13% | | | | | |
| OD reduction rate (%) | 62% | | | | | | 60% | | | | | |
| Saturation (C*) reduction rate (%) (printing mode 4 vs. printing mode 5) | 41% | | | | | | 40% | | | | | |
| OD reduction rate (%) | 24% | | | | | | 23% | | | | | |
| Saturation (C*) reduction rate (%) (printing mode 4 vs. printing mode 6) | 13% | | | | | | 13% | | | | | |
| OD reduction rate (%) | 53% | | | | | | 51% | | | | | |
| Saturation (C*) reduction rate (%) (printing mode 1 vs. printing mode 4) | 36% | | | | | | 35% | | | | | |
| OD reduction rate (%) | 11% | | | | | | 9% | | | | | |
| Saturation (C*) reduction rate (%) | 1% | | | | | | 1% | | | | | |

|  | Examples 5 | | | | | | Comparative Examples 1 | | | | | |
|---|---|---|---|---|---|---|---|---|---|---|---|---|
| Printing mode | 1 | 2 | 3 | 4 | 5 | 6 | 1 | 2 | 3 | 4 | 5 | 6 |
| OD value | 0.94 | 0.63 | 0.36 | 0.84 | 0.63 | 0.39 | 0.90 | 0.56 | 0.31 | 0.76 | 0.54 | 0.34 |
| Saturation (C*) | 45.6 | 38.7 | 26.2 | 45.0 | 39.0 | 28.5 | 44.4 | 35.5 | 23.5 | 42.2 | 35.0 | 25.2 |
| (printing mode 1 vs. printing mode 2) | | | | | | | | | | | | |
| OD reduction rate (%) | 33% | | | | | | 39% | | | | | |
| Saturation (C*) reduction rate (%) (printing mode 1 vs. printing mode 3) | 15% | | | | | | 20% | | | | | |
| OD reduction rate (%) | 62% | | | | | | 65% | | | | | |
| Saturation (C*) reduction rate (%) (printing mode 4 vs. printing mode 5) | 42% | | | | | | 47% | | | | | |
| OD reduction rate (%) | 24% | | | | | | 28% | | | | | |
| Saturation (C*) reduction rate (%) (printing mode 4 vs. printing mode 6) | 13% | | | | | | 17% | | | | | |
| OD reduction rate (%) | 53% | | | | | | 56% | | | | | |
| Saturation (C*) reduction rate (%) (printing mode 1 vs. printing mode 4) | 37% | | | | | | 40% | | | | | |
| OD reduction rate (%) | 11% | | | | | | 16% | | | | | |
| Saturation (C*) reduction rate (%) | 1% | | | | | | 5% | | | | | |

As shown in Table 3, Examples 1, 4, and 5 exhibited higher OD value and saturation (C*), and smaller the OD value decrease rate (%) and saturation (C*) decrease rate (%) than Comparison Example 1 in the same printing mode even when the ejection volume was reduced by changing at least one of the recording duties and the inherent characteristic. In other words, when the water-based ink of Examples 1, 4, and 5 is used, there was less deterioration of image quality than when the water-based ink of Comparative Example 1 was used. From these results, it is clear that the water-based ink of Examples 1, 4, and 5 can reduce the ejection amount of the water-based ink without impairing the image quality, as compared to the water-based ink of Comparative Example 1, and thus the amount of VOC generated can be reduced. Furthermore, even when reduced ink volume printing is performed, it can be seen that high-quality recording is possible using the water-based inks of Examples 1, 4, and 5, as compared to the water-based ink of Comparative Example 1.

As shown above, the water-based ink of the present disclosure can reduce VOC generation and has excellent image quality, ejection stability, and storage stability. The water-based inks of the present disclosure are widely applicable to inkjet recording on various recording media.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A water-based ink, comprising:
a colorant;
water;
a penetrating agent; and
a wetting agent,
wherein:
the penetrating agent comprises diethylene glycol monohexyl ether (DEHE);
the wetting agent comprises a compound having an SP value of 12 to 14; and
a ratio (A/B) of an amount (A) of the compound having an SP value of 12 to 14 to the amount (B) of DEHE is 2.5 or more.

2. The water-based ink according to claim 1, wherein the wetting agent comprises at least one of triethylene glycol and tripropylene glycol.

3. The water-based ink according to claim 1, wherein the ratio (A/B) of the amount (A) of the compound having an SP value of 12 to 14 to the amount (B) of DEHE is 2.5 or more and less than 10.

4. The water-based ink according to claim 1, wherein the amount of the compound having an SP value of 12 to 14 relative to a total mass of the water-based ink is 2.5 to 10.0 mass %.

5. The water-based ink according to claim 1, wherein the water-based ink is suitable for an inkjet recording on a recording medium.

6. A printed recording medium, comprising:
a substrate; and
the water-based ink according to claim 1, printed on the substrate.

7. An inkjet recording method, comprising:
ejecting the water-based ink according to claim 1 onto a recording medium to record an image on the recording medium.

8. The inkjet recording method according to claim 7, further comprising:
determining whether a specific condition is satisfied or not, wherein:
when the specific condition is determined as being not satisfied, a first ejecting mode in which the water-based ink is ejected based on image data, is performed to record the image; and
when the specific condition is determined as being satisfied, a second ejecting mode in which an amount of the water-based ink ejected is reduced as compared with the first ejecting mode, is performed to record the image.

9. The inkjet recording method according to claim 8, further comprising:
performing, on the image data, image processing based on a parameter for the image processing, wherein in the second ejecting mode, the parameter for the image processing is changed from the parameter for the image processing in the first ejecting mode such that an amount of the water-based ink ejected in the second ejecting mode is reduced compared with an amount of the water-based ink ejected in the first ejecting mode.

10. The inkjet recording method according to claim 9, wherein the second ejecting mode comprises at least one of a third ejecting mode and a fourth ejecting mode, in the third ejecting mode, the amount of the water-based ink ejected is reduced from the first ejecting mode by changing at least a portion of a dot size from a dot size in the first ejecting mode, thereby changing a recording duty, and in the fourth ejecting mode, the amount of the water-based ink ejected is reduced from the first ejecting mode by changing a characteristic inherent in an inkjet recording device.

11. The inkjet recording method according to claim 10, wherein in the third ejecting mode, a parameter for the image processing comprises a parameter for halftone processing, and the parameter for the halftone processing is changed, and in the fourth ejecting mode, the parameter for the image processing comprises a parameter for color tone adjustment processing, and the parameter for the color tone adjustment processing is changed.

12. An inkjet recording device, comprising:
the water-based ink according to claim 1;
an ink storing unit storing the water-based ink; and
an ink ejecting unit capable of ejecting the water-based ink to a recording medium.

13. The inkjet recording device according to claim 12, further comprising:
a determining unit determining whether a specific condition is satisfied or not, wherein:
when the specific condition is determined as being not satisfied, a first ejecting mode in which the water-based ink is ejected based on image data, is performed to record the image; and
when the specific condition is determined as being satisfied, a second ejecting mode in which an amount of the water-based ink ejected is reduced as compared with the first ejecting mode, is performed to record the image.

14. The inkjet recording device according to claim 13, further comprising:
an image processing unit that performs image processing, on the image data, based on a parameter for the image processing, wherein in the second ejecting mode, the parameter for the image processing is changed from the parameter for the image processing in the first ejecting mode such that an amount of the water-based ink ejected in the second ejecting mode is reduced compared with an amount of the water-based ink ejected in the first ejecting mode.

15. The inkjet recording device according to claim 14, wherein the second ejecting mode comprises at least one of a third ejecting mode and a fourth ejecting mode, in the third ejecting mode, the amount of the water-based ink ejected is reduced from the first ejecting mode by changing at least a portion of a dot size from a dot size in the first ejecting mode, thereby changing a recording duty, and in the fourth ejecting mode, the amount of the water-based ink ejected is reduced from the first ejecting mode by changing a characteristic inherent in the inkjet recording device.

16. The inkjet recording device according to claim 15, wherein in the third ejecting mode, a parameter for the image processing comprises a parameter for halftone processing, and the parameter for the halftone processing is changed, and in the fourth ejecting mode, the parameter for the image processing comprises a parameter for color tone adjustment processing, and the color tone adjustment processing is changed.

17. An ink storage container, comprising the water-based ink according to claim 1 stored therein.

* * * * *